March 10, 1942.  E. A. HAGEL  2,275,958
FLUID STRAINER
Filed March 17, 1939   3 Sheets-Sheet 1

Inventor:
Eugene A. Hagel

March 10, 1942.     E. A. HAGEL     2,275,958
FLUID STRAINER
Filed March 17, 1939     3 Sheets-Sheet 2

Inventor:
Eugene A. Hagel

March 10, 1942.　　　　E. A. HAGEL　　　　2,275,958
FLUID STRAINER
Filed March 17, 1939　　　3 Sheets-Sheet 3
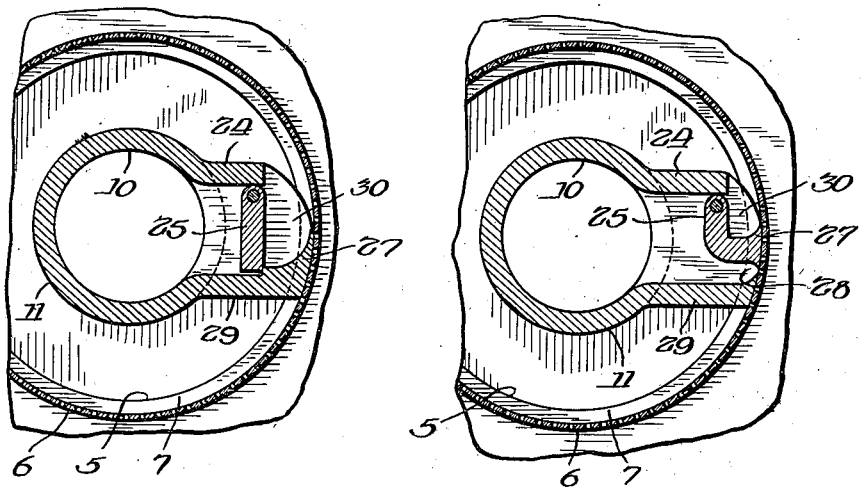
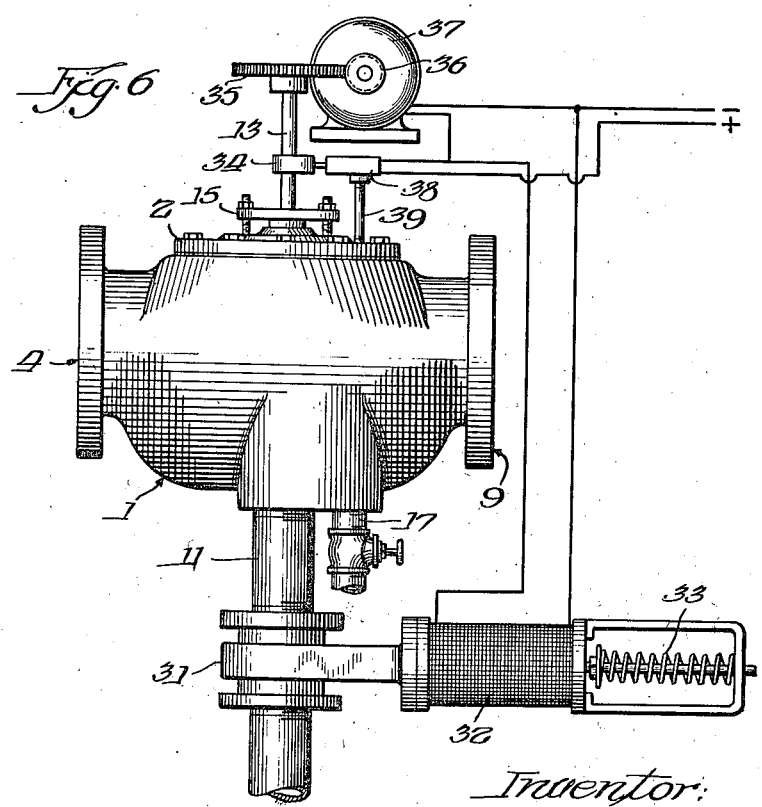
Inventor:
Eugene A. Hagel Patented Mar. 10, 1942

2,275,958

UNITED STATES PATENT OFFICE 2,275,958

FLUID STRAINER

Eugene A. Hagel, Chicago, Ill.

Application March 17, 1939, Serial No. 262,428

11 Claims. (Cl. 210—167)

This invention relates to a strainer for use in separating and removing from a fluid stream foreign solids and particles entrained or suspended therein. Particularly to a strainer for service under conditions where it is not feasible to interrupt the flow of fluid to permit cleaning and removal of the separated solids, such as in water supply systems, industrial processes and power plants.

Accordingly, one object of the present invention is to provide a strainer simple in construction and efficient in its operation and which will embody improved means for uninterrupted flow of fluid through the strainer while the foreign solids are being removed from the straining member and discharged under fluid pressure through a sludge discharge outlet.

Another object of my invention is to provide a strainer wherein the cleaning and discharge of the sludge may be continuous or at intervals and which may be accomplished either manually or by power means with the cleaning and discharge periods automatically controlled, such as with the use of a pressure actuated switch.

A further object of my invention is to provide a strainer wherein after scraping surface accumulations from any opening in the straining member, the residue remaining in the opening will be immediately backwashed into the scavenging member and discharged from the strainer, thus preventing its being carried into the strained fluid compartment.

A further object of my invention is to provide a strainer wherein as the foreign solids are scraped from the surface of the straining member they are collected in a pocket from which they are quickly discharged along with a minimum of unstrained fluid when the entire surface has been scraped.

A still further object of my invention is to backwash the openings in the straining member into a very narrow backwash inlet to the scavenging member to prevent a protracted reverse flow of strained fluid through openings already cleaned, thus avoiding the loss of strained fluid and a reduction of pressure as well.

A further advantage that will be apparent is that the straining member may be made of any reasonable thickness and adapted to accommodate removable straining sections.

In a strainer with power means to clean the straining member and to discharge the separated solids I provide a control actuated by abnormal pressure within the strainer to start the cleaning cycle. I further provide for continuance of cleaning and discharge until completion of the cycle, notwithstanding earlier resumption of the normal pressure. In this manner the rotating scavenging member is always stopped in an equalized position with the entire straining area clean, thus maintaining hydraulic equilibrium within the strainer.

Further objects and advantages of the present invention will be apparent from the following description, reference being had to the accompanying drawings, wherein a preferred form of the present invention is clearly shown.

In the drawings:

Fig. 4 is a vertical section of a modified form of scavenging member and door.

Fig. 5 is a vertical section of a further modified form of scavenging member and door.

Fig. 6 is a side elevation diagrammatically shown in parts of a typical installation.

Similar numerals refer to similar parts throughout the several views.

Figure 1:
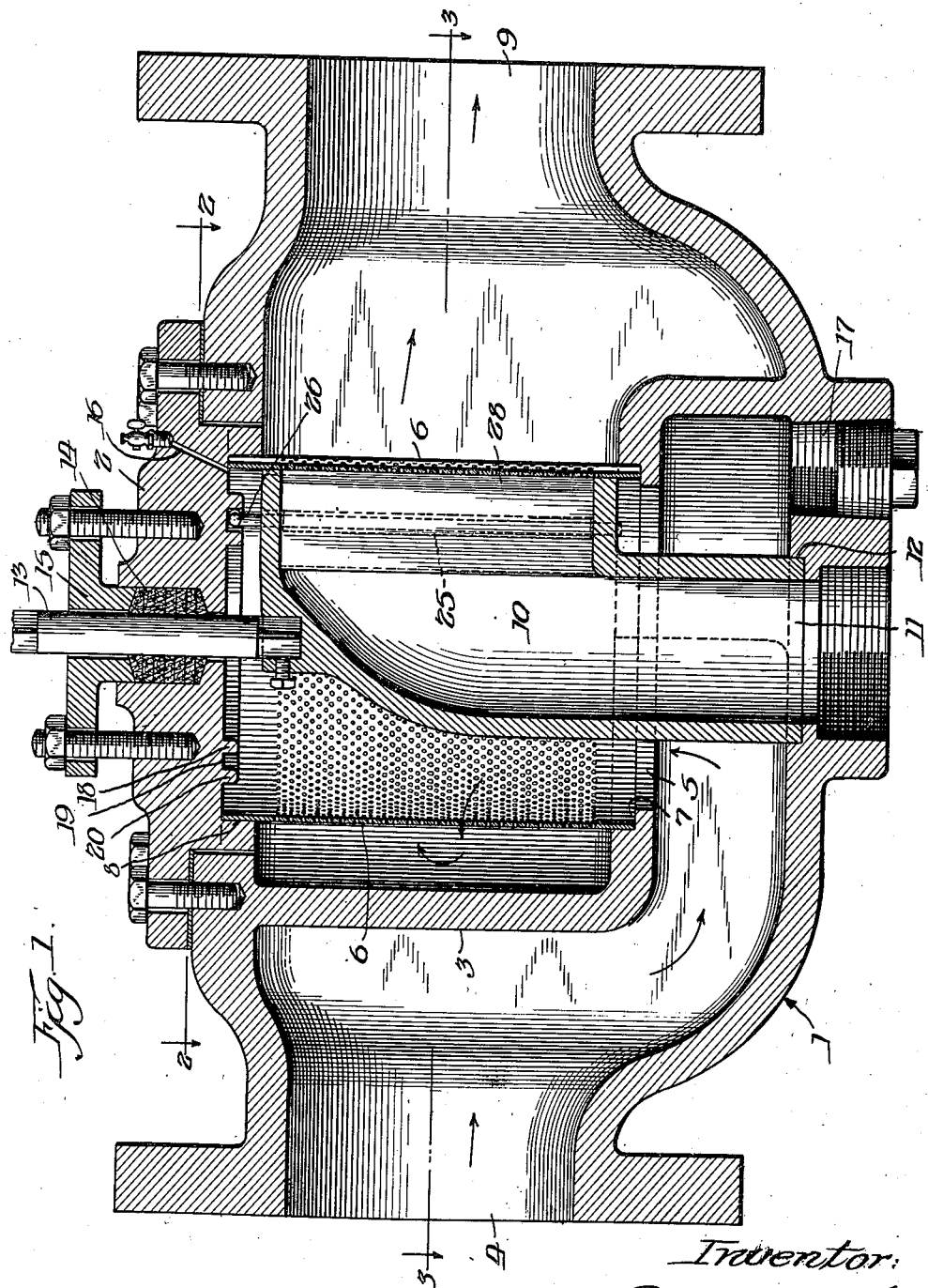
Fig. 1 is a longitudinal section substantially on a vertical center line of my improved strainer structure.
Figure 2:
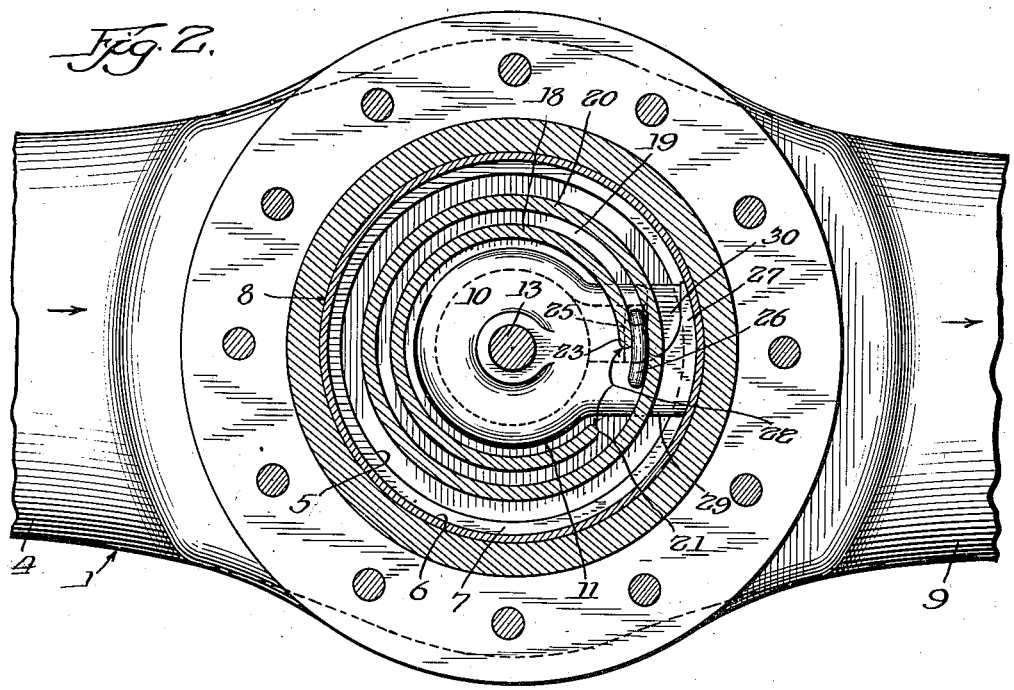
Fig. 2 is a plan section substantially on line 2—2 of Fig. 1.
Figure 3:
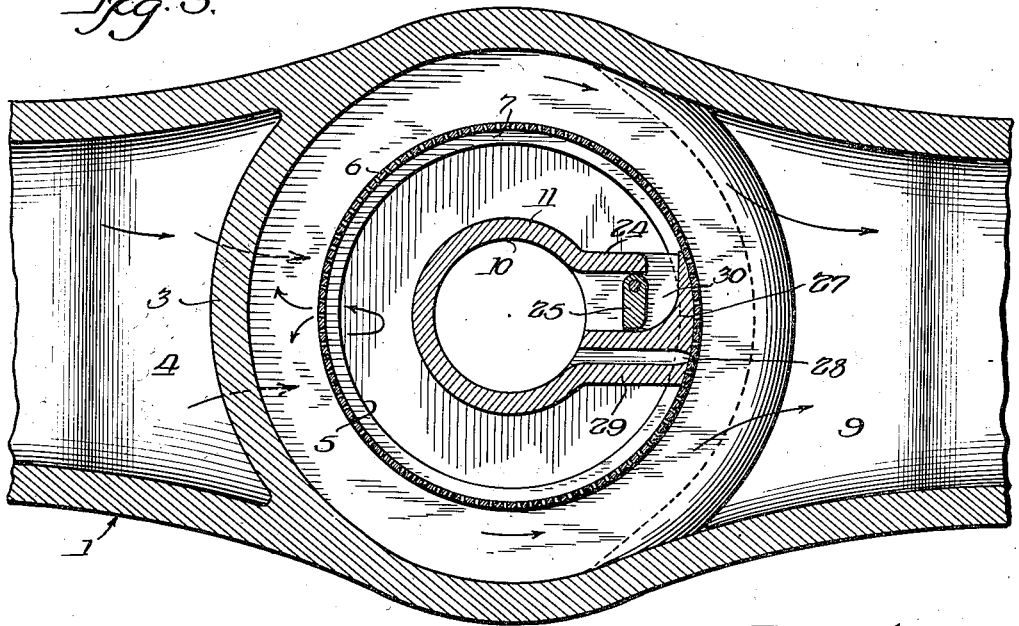
Fig. 3 is a plan section substantially on line 3—3 of Fig. 1.

Referring to the construction shown in Figs. 1, 2 and 3, flow chamber 1 and cover 2 constitute the body of the strainer. In flow chamber 1 is a dividing wall 3 separating inlet compartment 4 and outlet compartment 9. A port 5 in dividing wall 3 admits the fluid to be strained into the interior of a non-rotating cylindrical straining member 6. A pair of annular recesses 7 and 8, bottom and top respectively, maintain straining member 6 in operable position. The fluid being strained in passing through straining member 6 deposits the contained solids on the inner surface and in the openings. The strained fluid flowing on as shown by arrows through outlet compartment 9.

To remove these separated solids and to discharge them from the strainer I provide, coaxial with straining member 6, rotatable scavenging member 10 with its sludge discharge 11 journaled in flow chamber 1 at 12 and open to atmosphere or to a region of low pressure. Scavenging member 10 has a rotating shaft 13 journaled in stuffing box 14 in cover 2. The stuffing box 14 being kept tight by packing gland 15.

A vent opening 16 is provided to exhaust any air accumulated within the strainer and a bottom sediment outlet 17 is provided so that metallics, etc. may leave the body of strainer by gravity.

As shown in Fig. 3, scavenging member 10 has a backwash inlet 28 located between scraping shoe 27 and rearward wall 29. This narrow backwash inlet 28 opposes a vertical row of openings in straining member 6 and is adapted to admit only a backwash of the strained fluid. Between scraping shoe 27 and forward wall 24 is a door 25. The scraping shoe 27 and door 25 co-operating to form pocket 30. Door 25 has integral with it a trip lever 26 which travels during rotation of scavenging member 10 in a groove 19 located between inner rib 18 and outer rib 20 of cover 2 as shown in Fig. 2. The inner rib 18 having an opening therein forming recess 22 which admits trip lever 26 when door 25 opens. The inner rib 18 having release point 21 at one end and closing point 23 at the other end with the recess 22 between these points.

In Figs. 2 and 3 the scavenging member 10 is shown in its stationary position with door 25 closed and trip lever 26 in the groove 19. The valve 31 on Fig. 6 also being closed when scavenging member 10 is in this position. The fluid being strained flowing through the strainer as shown by arrows.

When sufficient solids have been deposited on the straining member 6 and in the openings to make cleaning advisible, valve 31, Fig. 6, is opened, thus opening interior of scavenging member 10 to a point of lower pressure than the pressure in outlet compartment 9. Simultaneously with the opening of valve 31 the scavenging member 10 is rotated slowly. As it rotates door 25 remains closed while trip lever 26 travels in groove 19. The scraping shoe 27 in its advance over the surface of straining member 6 removes surface deposits and accumulates them in pocket 30. After the removal of the surface deposit from any opening the residue remaining in the opening is immediately backwashed with strained fluid into scavenging member 10 through backwash inlet 28 and on to disposal through sludge discharge 11 to a point outside the strainer.

Upon trip lever 26 reaching release point 21 of inner rib 18 the door 25 is permitted to swing open under fluid pressure and the sludge accumulated in pocket 30 surges into interior of the scavenging member 10 and on through sludge discharge 11 to the same point of disposal outside the strainer.

Immediately after trip lever is released by release point 21 it comes in contact with closing point 23 of inner rib 18 which forces it back into groove 19 closing door 25. Valve 31, Fig. 6, is then closed and rotation of scavenging member 10 is stopped, completing the cleaning and discharge cycle.

When viscous fluids are being strained it may be desirable to have the stationary position of scavenging member 10 the reverse to that shown in Figs. 1, 2 and 3. It will be apparent that this may be accomplished by turning cover 2 half way around. It will also be apparent that groove 19 may be a channel in cover 2 with the recess 22 formed inwardly therefrom.

Fig. 4 shows a form of scavenging member 10 in which there is no provision for backwashing through openings in a straining member 6. This form may be desirable when the straining member 6 is made of porous material and the fluid being strained leaves only surface deposits.

Fig. 5 shows a form of scavenging member 10 in which the scraping shoe 27 and door 25 are made integral and which form, with a portion of the straining member 6, the pocket 30 for the accumulation of sludge scraped from the surface of the straining member 6. In this form as trip lever 26 travels in groove 19 the backwash inlet 28 is narrow and opposes only openings in straining member 6 and is adapted to admit only strained fluid as backwash through these openings. When trip lever 26 reaches release point 21 both the scraping shoe 27 and door 25 integral with it swing into interior of scavenging member 10 permitting entry thereto of the sludge accumulated in pocket 30.

Fig. 6 shows strainer with power means to rotate scavenging member 10 and to operate valve 31. The rotating shaft 13 is fitted with a worm gear 35 which is rotated by electrical motor 37 through worm 36. Valve 31 is operated by a solenoid 32. A pressure switch 38 connected to a source of power and leading to motor 37 and to solenoid 32 is closed by fluid pressure from within the strainer through pipe 39 which is screwed into vent opening 16.

When the pressure in the strainer reaches a predetermined variation from normal switch 38 closes and simultaneously starts motor 37 rotating scavenging member 10 and energizes solenoid 32 thus opening valve 31 and compressing valve disc return spring 33.

Upon restoration of normal pressure within the strainer switch 38 does not open. The cleaning of straining member 6 and discharge of sludge continuing until completion of the cycle when cam 34 on the rotating shaft 13 opens switch 38 stopping the rotation of scavenging member 10 and permitting valve disc return spring 33 to resume its normal tension closing valve 31. It will be apparent that valve 31 may also be closed by rotating means connected to the scavenging member 10, or by pressure of fluid being strained.

Where the strainer is used for the continuous removal of solids from a fluid stream, only motor 37 or other means for continuous rotation of scavenging member 10 is necessary. The sludge discharge 11 in such installations being open at all times, while fluid is being strained, to atmosphere or to a point of low pressure to permit the escape of the foreign solids being removed from the fluid stream.

It will be understood that the invention may be variously modified and embodied within the scope of the subjoined claims.

I claim as my invention:

1. In a fluid strainer, the combination of a body having an inlet and an outlet, a strainer member positioned intermediate said inlet and outlet, a scavenging member positioned adjacent the inlet face of said strainer member, said members movable relative one another, said scavenging member having a passageway therein communicating with the inlet side of the strainer member and the exterior of said strainer body, means carried by said scavenging member for directing foreign solids adjacent the face of said strainer member into said passageway in the scavenging member, and means for intermittently restricting the flow of fluid through said passageway.

2. In a fluid strainer, the combination of a body having an inlet and an outlet, a strainer member positioned intermediate said inlet and outlet, a scavenging member positioned adjacent the inlet face of said strainer member, said members movable relative to one another, said scavenging member having a passageway therein communicating with the inlet side of the strainer member and the exterior of said strainer body, means carried by said scavenging member for directing foreign solids adjacent the face of said strainer member into said passageway, and means for intermittently restricting the flow of fluid through said passageway, said scavenging member having a backwash inlet communicating with the inlet face of said strainer member and said passageway.

3. In a fluid strainer, the combination of a body having an inlet and an outlet, a cylindrical strainer member positioned intermediate said inlet and outlet, a scavenging member positioned in said strainer member adjacent the inlet face thereof, said scavenger member rotatable relative the other member, said body having a disposal outlet therein, said scavenging member having a passageway connecting said disposal outlet with the inlet side of the strainer member, said scavenging member being so formed as to provide scraping means for scraping foreign solids collected on said strainer member from the latter, and means for controlling the passage of fluid through said passageway during relative rotation of said scavenging and strainer members to allow disposal of such solids from the strainer at spaced intervals.

4. In a fluid strainer, the combination of a body having an inlet and an outlet, a strainer member positioned intermediate said inlet and outlet, a scavenging member positioned adjacent the inlet face of said strainer member, said members movable relative one another, said scavenging member having a passageway therein communicating with the inlet side of the strainer member and the exterior of the strainer body, means for restricting said passageway, said scavenging member having a pocket formed therein partially bounded by said restricting means, and means carried by said scavenging member for removing foreign solids adjacent the face of said strainer member and directing them into said pocket.

5. In a fluid strainer, the combination of a body having an inlet and an outlet, a strainer member positioned intermediate said inlet and outlet, a scavenging member positioned adjacent the inlet face of said strainer member, said members movable relative one another, said scavenging member having a passageway therein communicating with the inlet side of the strainer member and the exterior of said strainer body, means on the scavenging member for controlling the passage of fluid through said passageway, said means having a pocket formed therein, and means carried by said scavenging member for directing foreign solids adjacent the face of said strainer member into said pocket.

6. In a fluid strainer, the combination of a body having an inlet and an outlet, a strainer member positioned intermediate said inlet and outlet, a scavenging member positioned adjacent the inlet face of said strainer member, said members movable relative one another, said scavenging member having a passageway therein communicating with the inlet side of the strainer member and the exterior of the strainer body, a door carried by said scavenging member and movable in said passageway for controlling the passage of fluid through the same, said door having a pocket formed therein, and having a portion spaced from the scavenging member to form a backwash inlet therein communicating with said passageway and the face of the strainer member, and means carried by said scavenging member for directing foreign solids adjacent the face of said strainer member into said pocket.

7. In a fluid strainer, the combination of a body having an inlet and an outlet, a cylindrical strainer member positioned intermediate said inlet and outlet, a scavenging member positioned adjacent the inlet face of said strainer member, one of said members rotatable relative the other, said body having a disposal outlet therein, said scavenging member having a passageway connecting said disposal outlet and the strainer, means carried by said scavenging member for directing foreign solids collected on said strainer member into said passageway, a normally closed door positioned in said passageway restricting the latter during relative rotation of said scavenging and said strainer members, and means operable by such relative rotation for opening said door at spaced intervals during said rotation.

8. In a fluid strainer, the combination of a body having an inlet and an outlet, a strainer member positioned intermediate said inlet and outlet, a scavenging member positioned adjacent the inlet face of said strainer member, said members movable relative to one another, said scavenging member having a passageway therein communicating with the inlet side of the strainer member and the exterior of said strainer body, means carried by said scavenging member for directing foreign solids adjacent the face of said strainer member into said passageway, a door movable in said passageway to close the same, said scavenging member having a backwash inlet communicating with the face of said strainer member and said passageway and of relatively small area, as compared with the area of the passageway closed by said door, said backwash inlet trailing the said solid directing means during normal relative movement of said members, and means for opening and closing said door at spaced intervals during said relative movement.

9. In a fluid strainer, the combination of a body having an inlet and an outlet, a cylindrical strainer member positioned intermediate said body inlet and outlet, said inlet communicating with the interior of said strainer and said outlet with the exterior thereof, a scavenging member extending in said strainer member adjacent the inner face thereof, and rotatable relative thereto, said body having a disposal outlet, said scavenging member having a passageway extending between said disposal outlet and the strainer, means carried by said scavenging member for collecting and directing foreign solids disposed on said strainer member into said passageway, said means of a size to overlie a portion of said strainer member substantially throughout the effective longitudinal length thereof, the end of said passageway at the strainer member being of corresponding length, a door pivotally carried by said scavenging member for closing said passageway adjacent the strainer member, and a cam ring extending from said body engageable with means on said door to actuate the latter upon rotation of the scavenging member.

10. A scavenging member for a fluid strainer provided with a straining element, having a backwash inlet in said member opposing openings in the straining element to admit a reverse flow of strained fluid through said openings, and a relatively larger scraped sludge inlet open to inlet side of said straining member, both of said inlets communicating with a common point of disposal external to the strainer.

11. In a scavenging member as described in claim 10: A door operably mounted on said scavenging member for restricting the flow of fluid through the sludge inlet, and means carried by the member and engageable with a part of the strainer during relative rotation thereof to control its opening to admit scraped sludge through the sludge inlet to the interior of said scavenging member.

EUGENE A. HAGEL.